(12) United States Patent
Tabata et al.

(10) Patent No.: US 10,006,350 B2
(45) Date of Patent: Jun. 26, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Masakazu Tabata, Susono (JP); Sho Tomita, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 204 days.

(21) Appl. No.: 14/849,171

(22) Filed: Sep. 9, 2015

(65) Prior Publication Data

US 2016/0076438 A1    Mar. 17, 2016

(30) Foreign Application Priority Data

Sep. 11, 2014   (JP) .................................. 2014-185610
May 26, 2015   (JP) .................................. 2015-106509

(51) Int. Cl.
*F02B 37/18*      (2006.01)
*F02B 37/04*      (2006.01)
(Continued)

(52) U.S. Cl.
CPC ............ *F02B 37/186* (2013.01); *F02B 33/40* (2013.01); *F02B 37/04* (2013.01); *F02B 37/14* (2013.01);
(Continued)

(58) Field of Classification Search
CPC ........ F02B 37/186; F02B 37/22; F02B 33/40;
F02B 39/10; F02B 37/18; F02B 37/14;
F02B 37/04; F02P 5/045; F02D 37/02;
F02D 41/0007; F02D 23/00; F02D 2250/18; F02D 2200/101; F02D 41/1446;
F02D 41/1448; Y02T 10/144
(Continued)

(56) References Cited

U.S. PATENT DOCUMENTS

| 4,513,571 A | 4/1985 | Jenny et al. |
| 2003/0140630 A1* | 7/2003 | Baeuerle ................. F02B 33/32 60/612 |

(Continued)

FOREIGN PATENT DOCUMENTS

| CA | 1188168 A | 4/1985 |
| JP | 57-212331 A | 12/1982 |

(Continued)

*Primary Examiner* — Jason T Newton
(74) *Attorney, Agent, or Firm* — Andrews Kurth Kenyon LLP

(57) ABSTRACT

A control apparatus is provided for an internal combustion engine that includes a turbosupercharger, an electric supercharger, and a waste gate valve configured to open and close an exhaust bypass passage. In a single-supercharging range in which an engine torque is less than a torque boundary value, a WGV opening degree is controlled so as to decrease accompanying an increase in the engine torque. Further, in a twin-supercharging range in which the engine torque is equal to or greater than the torque boundary value, the WGV opening degree is controlled so as to increase accompanying an increase in the engine torque, and the electric motor is actuated for supercharging.

8 Claims, 8 Drawing Sheets

(51) Int. Cl.

| | | |
|---|---|---|
| *F02B 37/14* | (2006.01) | |
| *F02B 39/10* | (2006.01) | |
| *F02D 23/00* | (2006.01) | |
| *F02D 41/00* | (2006.01) | |
| *F02B 33/40* | (2006.01) | |
| *F02B 37/22* | (2006.01) | |
| *F02M 25/07* | (2006.01) | |
| *F02P 5/04* | (2006.01) | |
| *F02D 37/02* | (2006.01) | |
| *F02D 41/14* | (2006.01) | |

(52) U.S. Cl.
CPC .............. *F02B 37/18* (2013.01); *F02B 37/22* (2013.01); *F02B 39/10* (2013.01); *F02D 23/00* (2013.01); *F02D 37/02* (2013.01); *F02D 41/0007* (2013.01); *F02M 25/07* (2013.01); *F02P 5/045* (2013.01); *F02D 41/1446* (2013.01); *F02D 41/1448* (2013.01); *F02D 2200/101* (2013.01); *F02D 2250/18* (2013.01); *Y02T 10/144* (2013.01)

(58) Field of Classification Search
USPC .......................................................... 60/608
See application file for complete search history.

(56) References Cited

U.S. PATENT DOCUMENTS

| | | | | |
|---|---|---|---|---|
| 2008/0053091 | A1* | 3/2008 | Barthelet | F02B 37/10 60/608 |
| 2009/0107142 | A1* | 4/2009 | Russell | F02B 33/40 60/608 |
| 2010/0263374 | A1* | 10/2010 | Tanaka | F02B 37/14 60/608 |
| 2013/0000613 | A1* | 1/2013 | Meano | F02D 41/064 123/565 |
| 2013/0074495 | A1* | 3/2013 | Chi | F02B 37/10 60/605.2 |
| 2013/0199179 | A1* | 8/2013 | Kitsukawa | F02B 37/013 60/605.2 |
| 2013/0209291 | A1* | 8/2013 | Kitsukawa | F02B 37/013 417/410.1 |
| 2013/0255251 | A1 | 10/2013 | Tanaka et al. | |
| 2014/0013742 | A1* | 1/2014 | Mizuno | F02B 37/10 60/607 |
| 2014/0172207 | A1* | 6/2014 | Akashi | B60W 20/10 701/22 |
| 2014/0230430 | A1* | 8/2014 | Krug | F02B 29/0412 60/600 |
| 2016/0076438 | A1* | 3/2016 | Tabata | F02P 5/045 60/602 |
| 2016/0090929 | A1* | 3/2016 | Tanaka | F02D 41/12 123/406.52 |
| 2016/0230648 | A1* | 8/2016 | Sanchez | F02B 37/10 |
| 2016/0348578 | A1* | 12/2016 | Oyagi | F02B 39/16 |
| 2017/0030259 | A1* | 2/2017 | Tabata | F02D 41/10 |
| 2017/0044948 | A1* | 2/2017 | Caine | F02D 41/0255 |
| 2017/0051663 | A1* | 2/2017 | Inoue | F02B 37/183 |
| 2017/0138278 | A1* | 5/2017 | Xiao | F02D 41/005 |
| 2017/0145906 | A1* | 5/2017 | Tomita | F02B 37/14 |
| 2017/0159552 | A1* | 6/2017 | Suzuki | F02B 37/11 |
| 2017/0184014 | A1* | 6/2017 | Ueno | F02B 39/10 |
| 2017/0204774 | A1* | 7/2017 | Gonze | F01P 3/20 |

FOREIGN PATENT DOCUMENTS

| | | |
|---|---|---|
| JP | 2009-191686 A | 8/2009 |
| JP | 2010-249019 A | 11/2010 |
| JP | 2013-204534 A | 10/2013 |
| JP | 2014-015846 A | 1/2014 |
| WO | 2016/002964 A1 | 1/2016 |

* cited by examiner

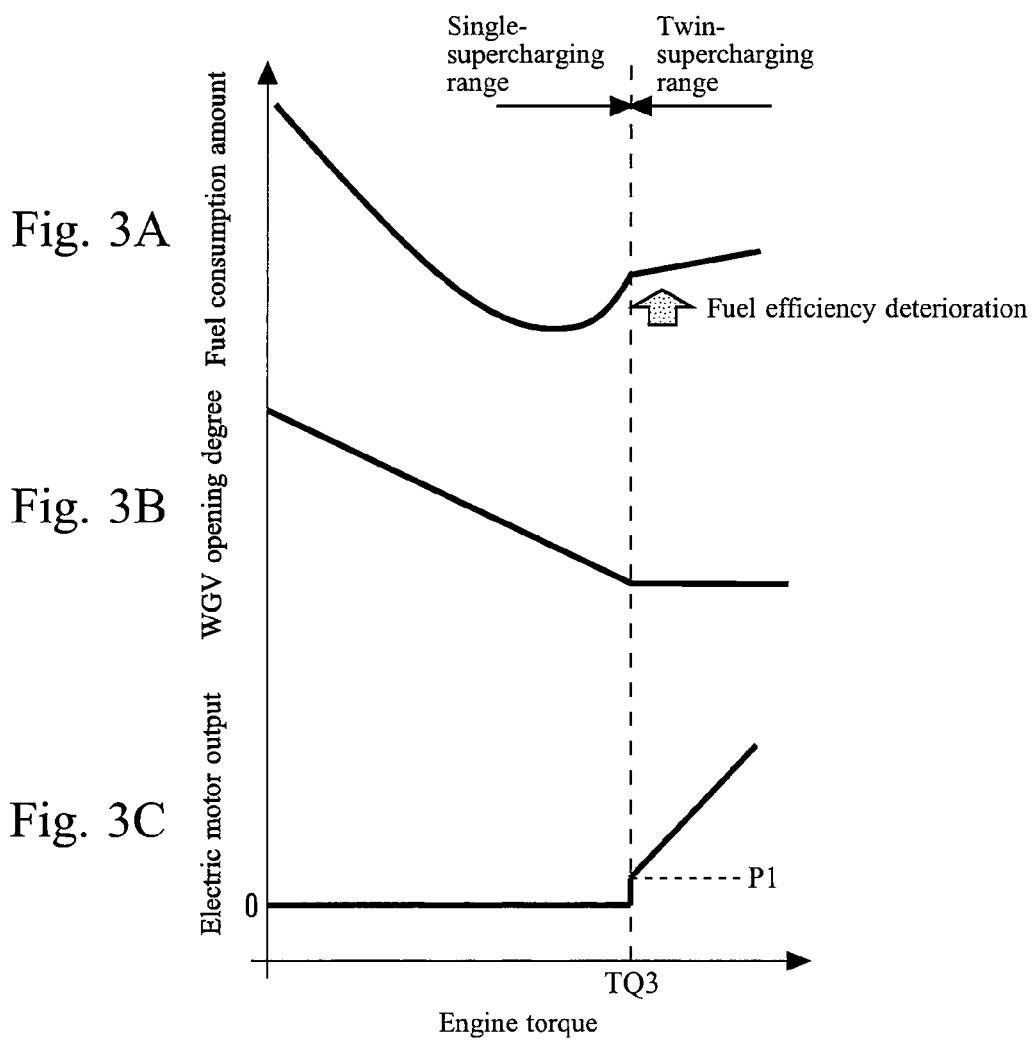

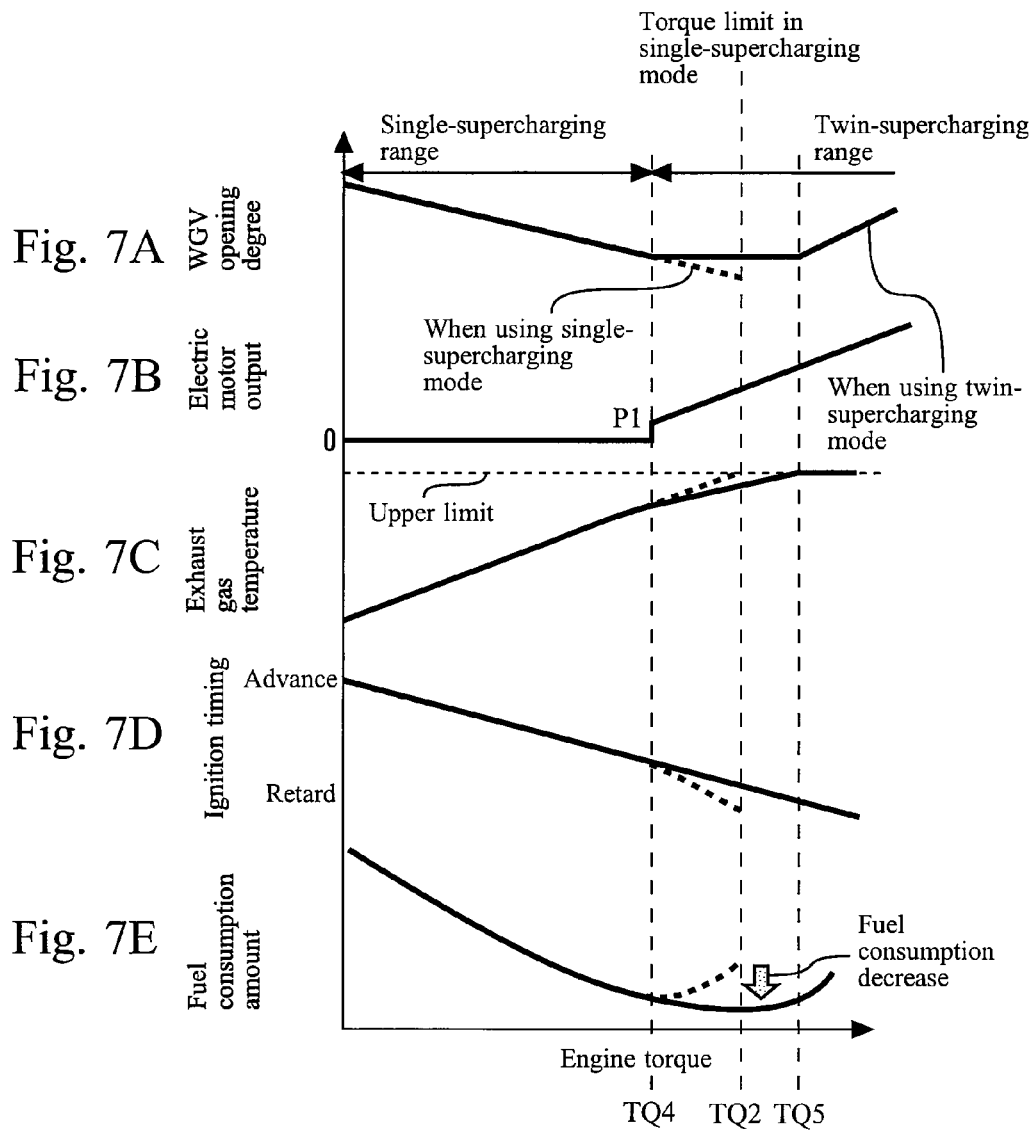

Fig. 8A
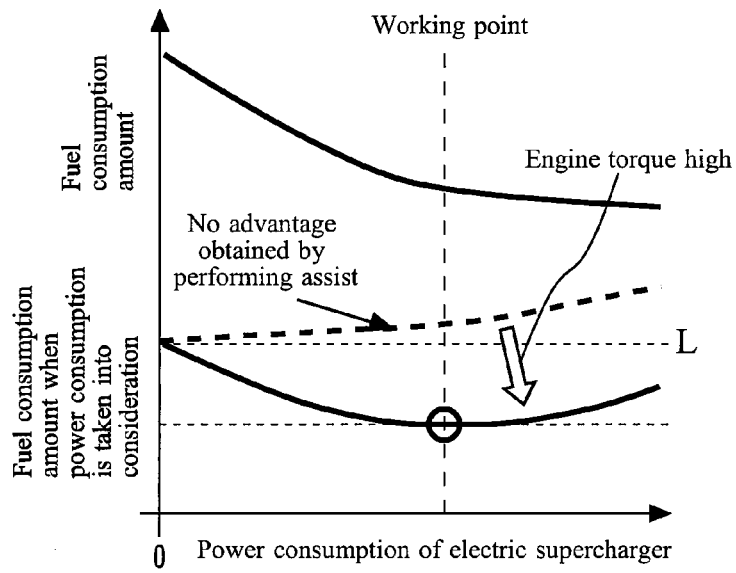
Fig. 8B
Fig. 9
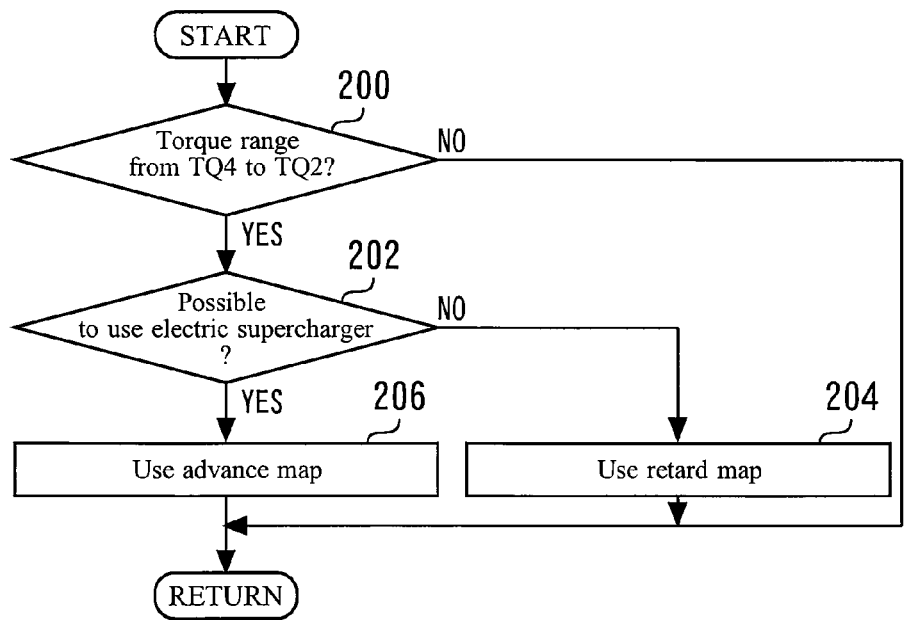

CONTROL APPARATUS FOR INTERNAL COMBUSTION ENGINE

CROSS-REFERENCE TO RELATED APPLICATIONS

The present application claims priority to Japanese Patent Application Nos. 2014-185610 filed on Sep. 11, 2014 and 2015-106509 filed May 26, 2015, both of which are incorporated herein by reference in their entireties.

BACKGROUND

Technical Field

Preferred embodiments relate to a control apparatus for an internal combustion engine that controls an internal combustion engine in which supercharging of intake air is performed by utilizing exhaust energy that is recovered by a turbine disposed in an exhaust passage of the internal combustion engine and utilizing an electric motor as power sources.

Background Art

A control apparatus for an internal combustion engine that includes a turbosupercharger, an exhaust bypass passage that bypasses a turbine of the turbosupercharger, and a waste gate valve that opens and closes the exhaust bypass passage has already been disclosed, as described in Japanese Patent Laid-Open No. 2014-015846 for example. The aforementioned control apparatus performs control so that an opening degree of the waste gate valve decreases as the torque required to the internal combustion engine increases.

Technical Problem

An internal combustion engine that includes an electric supercharger and a turbo supercharger is known. In such an internal combustion engine, in a case where it is attempted to perform steady operation while actuating the electric supercharger to assist supercharging by the turbosupercharger in a high-rotation and high-load range in the vicinity of an output point at which the highest engine output is obtained, the following problem arises if the waste gate valve control that is described in Japanese Patent Laid-Open No. 2014-015846 is adopted. That is, if the opening degree of the waste gate valve is controlled so as to merely decrease as the engine torque increases, there is a concern that when the electric supercharger is actuated, the exhaust gas pressure on the upstream side of the turbine will increase excessively since the opening degree of the waste gate valve is small, and consequently the fuel efficiency of the internal combustion engine will deteriorate. The above problem also applies in the case of an electric-motor-assisted turbosupercharger that includes an electric motor that assists driving of a compressor of the turbosupercharger.

SUMMARY

Preferred embodiments address the above-described problem and have an object to provide a control apparatus for an internal combustion engine that can improve the fuel efficiency of the internal combustion engine in a case where an electric motor is actuated to assist supercharging that utilizes exhaust energy in a high-rotation and high-load range.

A control apparatus for an internal combustion engine according to preferred embodiments controls an internal combustion engine that includes: a turbosupercharger configured to supercharge intake air by utilizing exhaust energy that is recovered by a turbine disposed in an exhaust passage of the internal combustion engine as a power source; an electric supercharger configured to supercharge intake air by utilizing an electric motor as a power source; an exhaust bypass passage that bypasses the turbine; electric motor as a power source; an exhaust bypass passage that bypasses the turbine; and a waste gate valve configured to open and close the exhaust bypass passage. The control apparatus includes a controller. The controller is configured to control an opening degree of the waste gate valve so that, in a first torque index value range in which a torque index value that has a correlation with an engine torque is less than a first boundary value, the opening degree of the waste gate valve decreases accompanying an increase in the engine torque. Also, the controller is configured to control the opening degree of the waste gate valve so that, in an increase range that is included in a second torque index value range in which the torque index value is equal to or greater than the first boundary value, the opening degree of the waste gate valve increases accompanying an increase in the engine torque. Further, the controller is configured to actuate the electric motor for supercharging in the second torque index value range.

Another control apparatus for an internal combustion engine according to preferred embodiments controls an internal combustion engine that includes: an electric-motor-assisted turbosupercharger configured to supercharge intake air by utilizing exhaust energy that is recovered by a turbine disposed in an exhaust passage of the internal combustion engine and utilizing an electric motor as power sources; an exhaust bypass passage that bypasses the turbine; and a waste gate valve configured to open and close the exhaust bypass passage. The control apparatus includes a controller. The controller is configured to control an opening degree of the waste gate valve so that, in a first torque index value range in which a torque index value that has a correlation with an engine torque is less than a first boundary value, the opening degree of the waste gate valve decreases accompanying an increase in the engine torque. Also, the controller is configured to control the opening degree of the waste gate valve so that, in an increase range that is included in a second torque index value range in which the torque index value is equal to or greater than the first boundary value, the opening degree of the waste gate valve increases accompanying an increase in the engine torque. Further, the controller is configured to actuate the electric motor for supercharging in the second torque index value range.

The controller may be configured to take all of the second torque index value range as the increase range and control the opening degree of the waste gate valve so that the opening degree of the waste gate valve increases accompanying an increase in the engine torque.

The second torque index value range may include a constant range in which the torque index value is equal to or greater than the first boundary value and is less than a second boundary value, and the increase range as a torque index value range in which the torque index value is equal to or greater than the second boundary value. In the constant range, the controller may be configured to control the opening degree of the waste gate valve so that the opening degree of the waste gate valve is kept constant or substantially constant with respect to a change in the engine torque. The first boundary value may be a torque index value that is lower than an upper limit of a torque index value that is determined by a constraint of a predetermined parameter under a non-motor assisted supercharging mode that is not accompanied by supercharging that adopts the electric motor as a power source. The opening degree of the waste gate valve in the constant range may be greater than the opening degree of the waste gate valve when the torque index value is the upper limit value in the non-motor assisted supercharging mode.

The controller may be configured to advance an ignition timing in a case where a motor assisted supercharging mode that is accompanied by supercharging that adopts the electric motor as a power source is available in a third torque index value range from the first boundary value to the upper limit value, compared to an ignition timing in a case where the non-motor assisted supercharging mode is used in the third torque index value range as a result of utilization of the motor assisted supercharging mode being restricted.

A lower limit of the increase range may be set based on an exhaust gas temperature.

A lower limit of the increase range may be set based on an exhaust gas pressure upstream of the turbine.

A lower limit of the increase range may be set based on a pumping loss of the internal combustion engine.

The first boundary value may be a value that decreases as an engine speed increases.

According to the control performed by the control apparatus for an internal combustion engine of preferred embodiments, an increase range in which an opening degree of a waste gate valve is controlled so as to increase accompanying an increase in an engine torque is included in a second torque index value range in which supercharging performed by utilizing the electric motor as a power source assists supercharging performed by utilizing exhaust energy that is recovered by the turbine as a power source. Therefore, in the second torque index value range, an increase in an exhaust gas pressure upstream of a turbine can be suppressed by utilizing supercharging that adopts the electric motor as a power source. Consequently, an improvement in the fuel efficiency of the internal combustion engine can be achieved.

BRIEF DESCRIPTION OF THE DRAWINGS

FIGS. 3A to 3C are views for describing a comparative example with respect to the first embodiment of the present invention;

FIGS. 7A to 7E are views that represent control characteristics with respect to the WGV opening degree and the output of an electric motor, respectively, that are used in a second embodiment of the present invention;

FIGS. 8A and 8B are views that are used for describing a technique for setting a torque boundary value TQ4 from the viewpoint of optimizing fuel efficiency;

FIG. 9 is a flowchart of a routine that is executed in the second embodiment of the present invention.

DETAILED DESCRIPTION

First Embodiment

First, a first embodiment of the present invention will be described referring to FIG. 1 to FIG. 6C.

[Hardware Configuration of First Embodiment]

Figure 1:
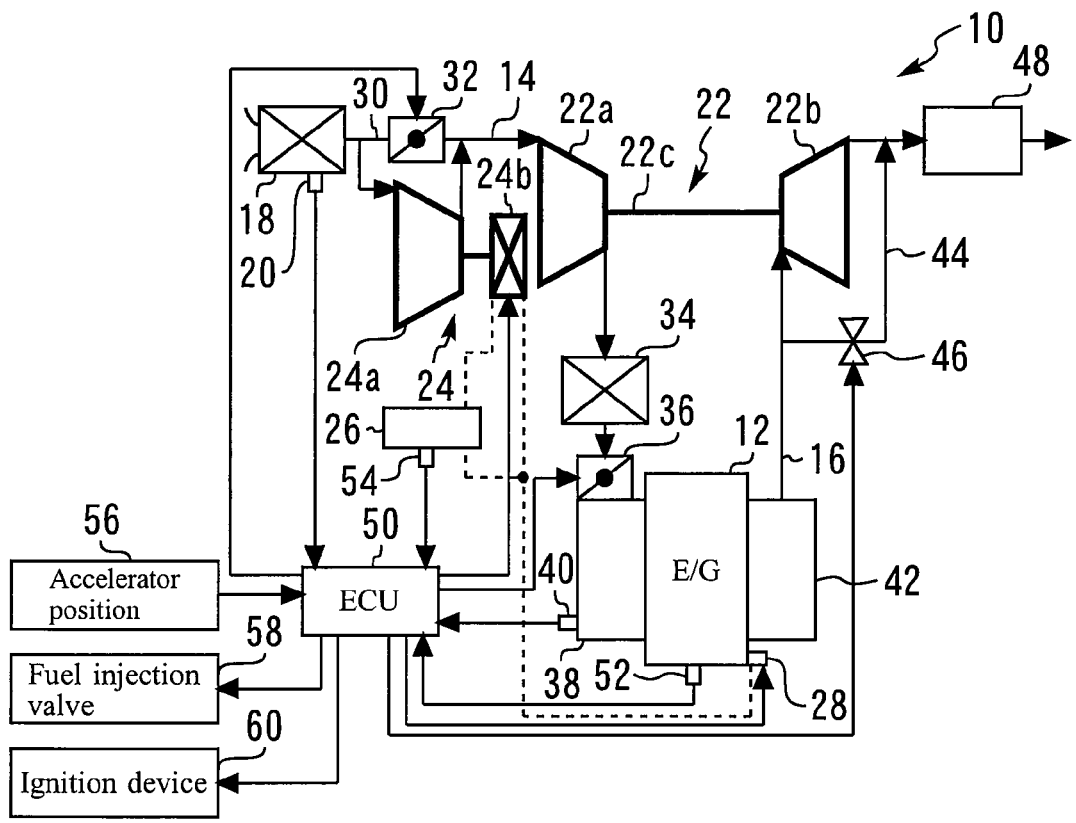
FIG. 1 is a view for schematically describing a system configuration of an internal combustion engine according to a first embodiment of the present invention.

FIG. 1 is a view for schematically illustrating the system configuration of a first embodiment of the present invention. An internal combustion engine 10 illustrated in FIG. 1 includes an internal combustion engine main body 12. The internal combustion engine 10 is a spark-ignition type engine (as one example, a gasoline engine), and is mounted in a vehicle and used as a power source of the vehicle. An intake passage 14 and an exhaust passage 16 communicate with the respective cylinders of the internal combustion engine main body 12.

An air cleaner 18 is provided in the vicinity of an inlet of the intake passage 14. An air flow sensor 20 that outputs a signal in accordance with a flow rate of air that flows through the intake passage 14 is provided in the air cleaner 18. A compressor 22a of a turbosupercharger 22 for supercharging intake air is disposed in the intake passage 14 at a position that is on a downstream side relative to the air cleaner 18. The turbosupercharger 22 includes a turbine 22b that is provided in the exhaust passage 16 and that operates by means of the exhaust energy of exhaust gas. The compressor 22a is integrally connected to the turbine 22b through a connecting shaft 22c, and is rotationally driven by exhaust energy of exhaust gas that enters the turbine 22b.

A compressor 24a of an electric supercharger 24 is disposed in the intake passage 14 at a position that is on the downstream side relative to the air cleaner 18 and is on the upstream side relative to the compressor 22a. The compressor 24a is driven by an electric motor 24b. The electric motor 24b is connected to a battery 26. The electric power of the battery 26 is used as the power for driving the electric motor 24b. More specifically, electric power that is generated at an alternator 28 can be supplied to the electric motor 24b directly or through the battery 26. The electric supercharger 24 makes it possible to supercharge intake air by driving the compressor 24a using the electric motor 24b. The internal combustion engine 10 also includes an intake bypass passage 30 that bypasses the compressor 24a, and an intake bypass valve 32 configured to open and close the intake bypass passage 30. For example, a butterfly-type motor-driven valve can be used as the intake bypass valve 32.

An intercooler 34 is disposed in the intake passage 14 at a position on the downstream side relative to the compressor 22a. The intercooler 34 is used for cooling intake air compressed by the compressor 22a or by both the compressor 22a and the compressor 24a. An electronically controlled throttle valve 36 that opens and closes the intake passage 14 is disposed in the intake passage 14 on the downstream side relative to the intercooler 34. A portion of the intake passage 14 that is on the downstream side relative to the throttle valve 36 is configured as an intake manifold 38. Intake air is distributed to the respective cylinders through the intake manifold 38. An intake air pressure sensor 40 that detects an intake air pressure (more specifically, an intake manifold pressure) is attached to the intake manifold 38.

Exhaust gas from the respective cylinders is collected by an exhaust manifold 42 in the exhaust passage 16, and discharged to the downstream side. An exhaust bypass passage 44 that bypasses the turbine 22b is connected to the exhaust passage 16. A waste gate valve (WGV) 46 is disposed in the exhaust bypass passage 44 as a bypass valve for opening and closing the exhaust bypass passage 44. As one example, the WGV 46 is an electric motor-driven valve, and is configured to be adjustable to an arbitrary opening degree within a predetermined opening degree control range. By changing the opening degree of the WGV 46, the flow rate of exhaust gas that passes through the turbine 22b can be adjusted to thereby adjust the driving force of the compressor 22a. A catalyst 48 for purifying exhaust gas is disposed in the exhaust passage 16 at a position on the downstream side relative to the turbine 22b.

The system of the present embodiment also includes an electronic control unit (ECU) 50. The ECU 50 includes at least an input/output interface, a memory, and a central processing unit (CPU). The input/output interface is configured to take in sensor signals from various sensors installed in the internal combustion engine 10 or the vehicle in which the internal combustion engine 10 is mounted, and also to output actuating signals to various actuators provided in the internal combustion engine 10. The sensors from which the ECU 50 takes in signals include, in addition to the aforementioned air flow sensor 20 and intake air pressure sensor 40, various sensors for acquiring the engine operating state such as a crank angle sensor 52 for acquiring the rotational position of a crankshaft and the engine speed. The aforementioned sensors also include an SOC sensor 54 that detects a state-of-charge (SOC) of the battery 26, and an accelerator position sensor 56 for detecting a depression amount of an accelerator pedal (accelerator position) of the vehicle in which the internal combustion engine 10 is mounted. In addition to the aforementioned electric motor 24b, alternator 28, intake bypass valve 32, throttle valve 36 and WGV 46, the actuators to which the ECU 50 outputs actuating signals also include various actuators for controlling engine operations such as fuel injection valves 58 for supplying fuel into the combustion chambers of the respective cylinders and an ignition device 60 for igniting an air-to-fuel mixture in the respective combustion chambers. Various control programs and maps and the like for controlling the internal combustion engine 10 are stored in the memory. The CPU reads out a control program from the memory and executes the control program or the like, and generates actuating signals for the various actuators based on sensor signals taken in.

[Technique for Controlling Engine Torque in First Embodiment]

(Differences in the Engine Torque Control Technique According to the Operation Ranges)

Figure 2:
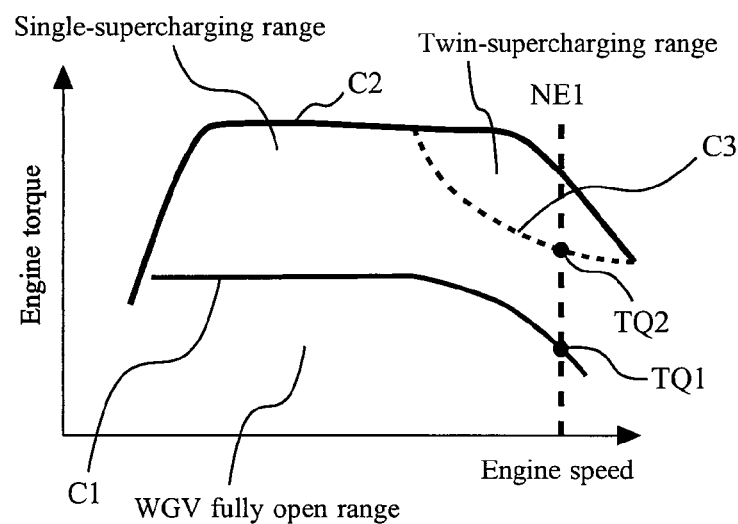
FIG. 2 is a view for describing a relation between a technique for controlling engine torque that is used in the system illustrated in FIG. 1 and engine operation ranges.

FIG. 2 is a view for describing the relation between a technique for controlling engine torque that is used in the system illustrated in FIG. 1 and engine operation ranges. In the present embodiment, engine torque control in accordance with the relation illustrated in FIG. 2 is used at a time of steady operation when the internal combustion engine 10 is operating in a steady state. The term "steady state" refers to a state in which the engine speed and the engine torque are kept constant with respect to passage of time. However, a configuration may also be adopted so that the engine torque control in accordance with the aforementioned relation is performed in a transient state in which the engine speed and the engine torque change with respect to passage of time.

(WGV Fully Open Range)

As shown in FIG. 2, in an operation range on a low load (low engine torque) side, in a state in which the WGV 46 is opened at the maximum opening degree (fully open opening degree) within the opening degree control range, the amount of intake air is controlled by adjusting the opening degree of the throttle valve 36, and as a result the engine torque is controlled. In this operation range (hereunder, referred to as "WGV fully open range"), supercharging of intake air is not performed with the exception of one part of a high engine speed range in which supercharging is performed to a certain extent by the turbosupercharger 22 because the air flow rate increases. On the other hand, supercharging of intake air is performed in the WGV fully open range. In this case, either one of a single-supercharging mode and a twin-supercharging mode is selected in accordance with the engine operation range.

(Single-Supercharging Range)

A single-supercharging range in which a single-supercharging mode is utilized is set on a high load side (high engine torque side) relative to the WGV fully open range. The single-supercharging mode is a supercharging mode that utilizes only the turbosupercharger 22. In the single-supercharging mode, passage of a current to the electric motor 24b is stopped and the intake bypass valve 32 is fully opened. As a result, intake air that is supercharged by the turbosupercharger 22 utilizing exhaust energy is supplied to the combustion chambers of the respective cylinders while avoiding the occurrence of a situation in which the compressor 24a of the electric supercharger 24 constitutes intake resistance. In the single-supercharging range in which the single-supercharging mode is performed, in a state in which the throttle valve 36 is kept fully open, the supercharging pressure is controlled by controlling the opening degree of the WGV 46, and as a result the amount of intake air changes and thus the engine torque is controlled.

A curve C1 indicated by a solid line in FIG. 2 is a curve that indicates a boundary between the WGV fully open range and the single-supercharging range. In other words, the curve C1 is a curve that is obtained by connecting engine operating points at which the maximum engine torque (corresponds to a torque boundary value TQ1 that is described later) is realized in a state in which the throttle opening degree has been placed in a fully open state in a WGV fully open range.

(Twin-Supercharging Range)

A range located on a high-rotation and high-load side relative to the single-supercharging range is set as a twin-supercharging range in which the twin-supercharging mode is utilized. The twin-supercharging mode is a supercharging mode that utilizes the electric supercharger 24 as well as the turbosupercharger 22 in a state in which the throttle valve 36 is kept fully open. In the twin-supercharging mode, a current is passed to the electric motor 24b in a state in which the intake bypass valve 32 has basically been fully closed. As a result, intake air that is introduced into the intake passage 14 is subjected to supercharging by the electric supercharger 24 and the turbosupercharger 22 in that order, and is thereafter supplied to the combustion chambers of the respective cylinders. By this means, the electric supercharger 24 can be utilized to assist supercharging by the turbosupercharger 22. Hereunder, utilization of the electric supercharger 24 to assist supercharging by the turbosupercharger 22 is referred to simply as "electric assist".

A curve C2 indicated by a solid line in FIG. 2 is a curve that is obtained by connecting engine operating points at which the maximum engine torque is obtained in a state in which the single-supercharging mode or twin-supercharging mode is utilized. Note that a curve C3 indicated by a broken line in FIG. 2 is a curve that indicates a boundary between the single-supercharging range and the twin-supercharging range, and corresponds to the locus of torque boundary values TQ2 (see FIGS. 4A to 4C) on FIG. 2.

(Advantages of Twin-Supercharging Mode)

If the single-supercharging mode is used in a high-rotation and high-load range in a state in which the WGV 46 is being closed, the supercharging pressure and the exhaust gas pressure upstream of the turbine will rise, and as a result the temperature of exhaust gas that is discharged from inside the cylinders (hereunder, referred to simply as "exhaust gas temperature") will rise and pumping loss will also increase. Further, because of the increase in pumping loss, if the single-supercharging mode is used in a torque range in the vicinity of a torque limit in the single-supercharging mode, the fuel efficiency will deteriorate as shown in FIG. 3A that is described later. Note that, the torque limit in the single-supercharging mode is determined by a constraint that is due to the exhaust gas temperature, the exhaust gas pressure upstream of the turbine, or the pumping loss (corresponds to a "predetermined parameter" in the present disclosure). As described later, in the present embodiment, as one example, the torque limit in the single-supercharging mode is determined by the exhaust gas temperature. The torque that is a limit under the single-supercharging mode (corresponds to "upper limit of a torque index value" in the present disclosure) is a value that can be determined, for example, by experiment as an upper limit value of the engine torque that can be obtained utilizing the single-supercharging mode while under the constraint of the aforementioned predetermined parameter such as the exhaust gas temperature.

The basic advantageous effects obtained by utilizing the twin-supercharging mode (that is, by performing electric assist) will now be described. As described above, it can be said that, due to an increase in the pumping loss, the fuel efficiency will deteriorate if the single-supercharging mode is used in a torque range in the vicinity of a torque limit in the single-supercharging mode. In this regard, by performing electric assist in a high-rotation and high-load range, the electric supercharger 24 can be caused to perform part of the supercharging that the turbosupercharger 22 would be responsible for if the engine were operating in the single-supercharging mode. By this means, since the load of the turbo supercharger 22 can be reduced, engine torque that is the same as the engine torque in the single-supercharging mode can be realized in a state in which the opening degree of the WGV is a larger degree of opening, and hence an increase in pumping loss that is attributable to an increase in the exhaust gas pressure can be suppressed. An increase in the exhaust gas temperature that is attributable to an increase in the exhaust gas pressure can also be suppressed. Therefore, when utilizing a high-rotation and high-load range, an improvement in the fuel efficiency can be achieved by utilizing the electric assist. However, as described hereunder, the setting of the WGV opening degree when performing electric assist is important in order to effectively exert a fuel efficiency improvement effect that is produced by utilization of the electric assist.

Explanation of Comparative Example

A comparative example that will now be described referring to FIGS. 3A to 3C is conceivable as a simple technique for controlling the WGV opening degree and the electric motor output in the case of using the twin-supercharging range. That is, in the case of performing electric assist in a high torque range, as illustrated in this comparative example, it is conceivable to perform control so as to reduce the WGV opening degree as the engine torque increases in the single-supercharging range, and in a torque range onwards from a torque value TQ3 that is the value of the engine torque when the WGV opening degree reaches a minimum opening degree that corresponds to a torque limit in the single-supercharging mode, to perform the electric assist while keeping the WGV opening degree constant at the aforementioned minimum opening degree.

As described above, it can be said that a torque range in the vicinity of the torque limit in the single-supercharging mode is a range in which the fuel efficiency is originally not good, and performing electric assist to reduce the load of the turbosupercharger 22 is basically effective for improving the fuel efficiency. However, if a control technique is used that performs electric assist after reaching the torque limit in the single-supercharging mode, as in the comparative example illustrated in FIGS. 3A to 3C, in the twin-supercharging range the electric motor output will be increased accompanying an increase in the engine torque while the WGV opening degree remains constant. Consequently, due to an increase in the flow rate of exhaust gas that flows into the turbine 22b, the exhaust gas pressure (exhaust manifold pressure) upstream of the turbine becomes excessively large. Since this fact is related to an increase in pumping loss, an effect of improving the fuel efficiency that is produced by performing the electric assist becomes difficult to be effectively exerted. Further, an increase in the exhaust gas temperature can no longer be suppressed.

(Characteristic Engine Torque Control Technique in First Embodiment)

Figure 4A:
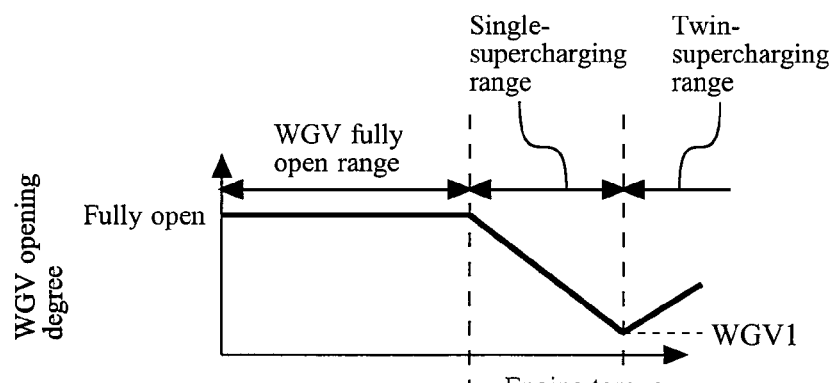
FIGS. 4A to 4C are views that represent control characteristics with respect to the opening degree of a WGV, the output of an electric motor, and a throttle opening degree, respectively, in respective engine torque ranges.
Figure 4B:
Figure 4C:
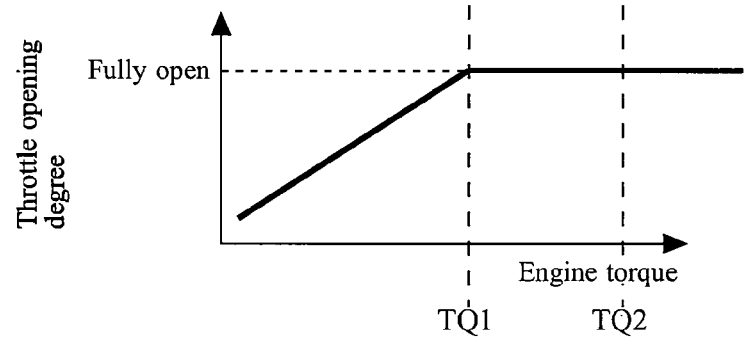

A characteristic of the system of the present embodiment is the technique for controlling the opening degree of the WGV 46 and the output of the electric supercharger 24 in the twin-supercharging range. FIGS. 4A to 4C are views that represent control characteristics with respect to the opening degree of the WGV 46, the output of the electric motor 24b, and the throttle opening degree, respectively, in respective ranges of the engine torque. FIGS. 4A to 4C illustrate settings under a condition of an identical engine speed (as one example, an engine speed NE1 shown in FIG. 2) in a high engine speed range that utilizes the twin-supercharging mode.

More specifically, FIG. 4A illustrates the relation between the engine torque and the WGV opening degree in a steady state, and FIG. 4B illustrates the relation between the engine torque and the electric motor output in a steady state. In FIGS. 4A to 4C, a torque range that is lower than the torque boundary value TQ1 corresponds to the aforementioned WGV fully open range. As shown in FIG. 4C, in the WGV fully open range, in a state in which the WGV opening degree is kept constant at the maximum opening degree (fully open opening degree) in the opening degree control range, the throttle opening degree is controlled so as to increase as the engine torque increases. The throttle opening degree reaches a fully open opening degree when the engine torque becomes the torque boundary value TQ1.

A torque range in which the torque is greater than or equal to the torque boundary value TQ1 and less than the torque boundary value TQ2 corresponds to the aforementioned single-supercharging range. In the single-supercharging range the throttle opening degree is maintained at the fully open opening degree. The WGV opening degree is controlled so as to decrease accompanying an increase in the engine torque in a manner that takes the torque boundary value TQ2 as the upper limit. Further, in the single-supercharging range the electric motor output is set to zero (that is, passage of a current to the electric motor 24b is not performed).

A torque range in which the torque is greater than or equal to the torque boundary value TQ2 corresponds to the aforementioned twin-supercharging range. In the twin-supercharging range also, the throttle opening degree is maintained at the fully open opening degree. The electric motor output is set to a value P1 at the torque boundary value TQ2. The output P1 is an electric motor output that is required in order to exert a compressor rotational speed that is necessary to ensure that the presence of the compressor 24a does not constitute intake resistance under an intake air amount at which the torque boundary value TQ2 is obtained. Furthermore, when the electric motor output becomes higher than P1, the compressor 24a performs work for the outside (that is, starts supercharging).

In the twin-supercharging range, the electric motor output becomes higher than P1 when the torque boundary value TQ2 is exceeded, and as a result, supercharging for which the electric supercharger 24 is utilized is added. The electric motor output is controlled so that an engine torque can be obtained that matches the engine torque of the horizontal axis in FIGS. 4A to 4C under control of the WGV opening degree that is in accordance with the characteristic illustrated in FIG. 4A. Specifically, the electric motor output is controlled so as to increase as the engine torque increases. On the other hand, the WGV opening degree is controlled so as to increase as the engine torque increases, in a manner which takes a value WGV1 that is the opening degree at the torque boundary value TQ2 as the minimum value. Note that, according to the control characteristic for the WGV 46 illustrated in FIG. 4A, a torque range in which the torque is equal to or greater than the torque boundary value TQ2 (twin-supercharging range) corresponds to an "increase range" in the present disclosure.

(Advantages and Details of Control Technique of First Embodiment)

Unlike the above described comparative example, according to the control characteristics of the present embodiment that are illustrated in FIGS. 4A to 4C, the twin-supercharging range is taken as an "increase range" with regard to the WGV opening degree, and the WGV opening degree is set so as to increase relative to the opening degree WGV1 as the engine torque increases. By this means, a rise in the exhaust gas pressure that is ascribable to an increase in the electric motor output that accompanies an increase in the engine torque can be suppressed. Therefore, the fuel efficiency can be improved by utilizing the electric assist. Further, an increase in the exhaust gas temperature can be suppressed.

A point of inflection in the control characteristic of the WGV opening degree shown in FIG. 4A (engine operating point at which the torque boundary value TQ2 between the single-supercharging range and the twin-supercharging range is obtained) changes according to the engine speed, as shown by the curve C3 in the engine operation range shown in FIG. 2. As shown in FIG. 2, in the relation between the torque boundary value TQ2 and the engine speed, the torque boundary value TQ2 is set so as to decrease as the engine speed increases. More specifically, in the present embodiment, the torque boundary value TQ2 is set as an engine torque at which the WGV opening degree (WGV1) is obtained. WGV1 is an opening degree at which the exhaust gas temperature reaches a predetermined upper limit temperature in a situation in which the WGV opening degree is decreased as the engine torque increases in the single-supercharging range. The engine torque at which the exhaust gas temperature reaches the upper limit temperature decreases as the engine speed increases. Accordingly, when the torque boundary value TQ2 is set from the viewpoint of a constraint that is due to the exhaust gas temperature, the torque boundary value TQ2 decreases as the engine speed increases, as described above. According to this setting, the torque boundary value TQ2 can be appropriately set in a manner that takes the exhaust gas temperature into consideration. Further, according to this setting, since utilization of the single-supercharging mode is continued until the engine torque (TQ2) that is the limit from the viewpoint of the exhaust gas temperature when utilizing the single-supercharging mode, a torque range in which the electric supercharger 24 is utilized can be narrowed. It is thereby possible to suppress electric power consumption by the electric supercharger 24.

Next, a preferable setting example with respect to setting of the WGV opening degree in the twin-supercharging range will be described. The WGV opening degree in the twin-supercharging range in FIG. 4A of the present embodiment is set so as to open accompanying an increase in the engine torque in a form in which the exhaust gas temperature is maintained at the above described upper limit temperature. If a setting such that the WGV opening degree changes with a more moderate slope than the setting illustrated in FIG. 4A for which the aforementioned consideration is given with respect to setting of the WGV opening degree is used, the exhaust gas temperature will exceed the upper limit temperature. Conversely, if a setting such that the WGV opening degree changes with a sharper slope than the setting illustrated in FIG. 4A is used, because the exhaust energy supplied to the turbine 22b becomes smaller, such a setting will lead to an increase in the electric power consumption of the electric supercharger 24. Therefore, according to the setting of the WGV opening degree that is shown in FIG. 4A, an increase in the electric power consumption of the electric supercharger 24 can be suppressed while ensuring that the exhaust gas temperature does not exceed the upper limit temperature.

Specific Processing in First Embodiment

Figure 5:
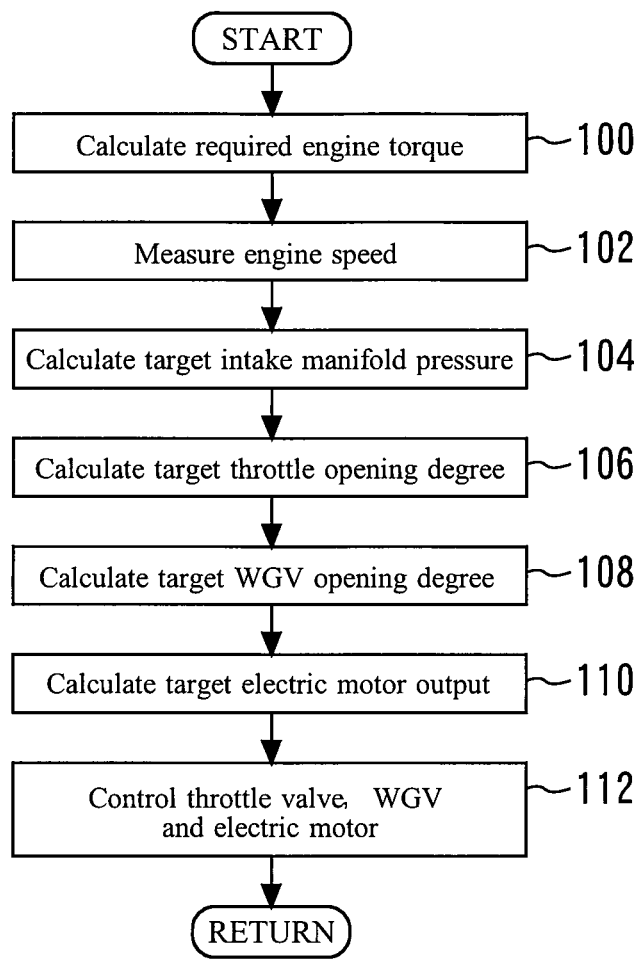
FIG. 5 is a flowchart of a routine that is executed in the first embodiment of the present invention.
Figure 6A:
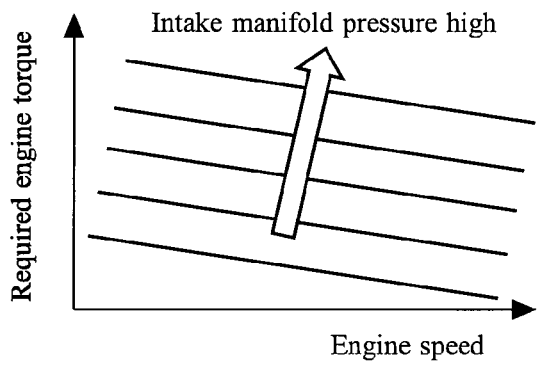
FIGS. 6A to 6C are views that represent settings of various maps that are calculated in the routine shown in FIG. 5.
Figure 6B:
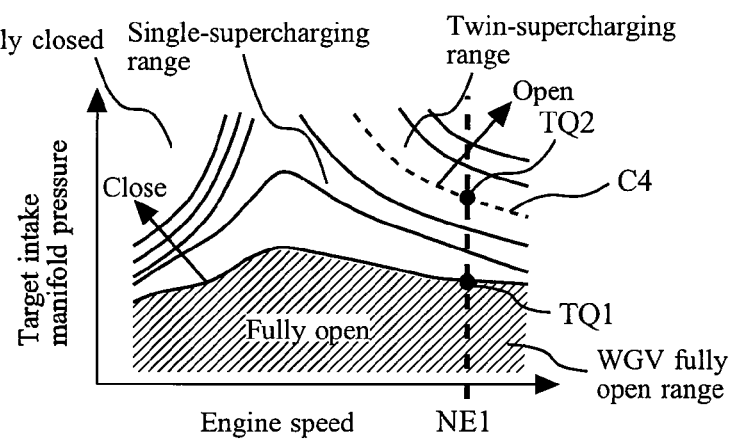
Figure 6C:
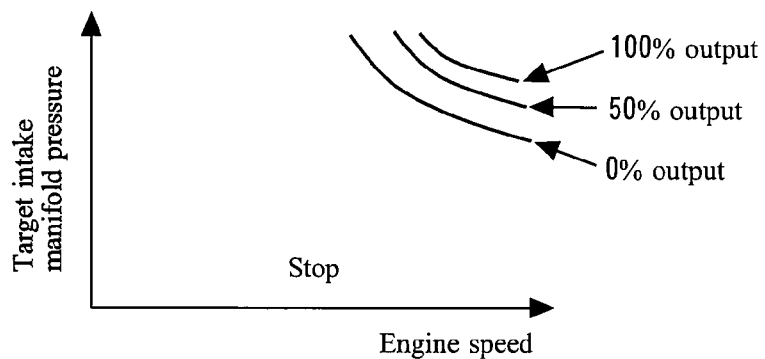

FIG. 5 is a flowchart illustrating a routine that the ECU 50 executes to control the engine torque. FIGS. 6A to 6C are views that represent settings of various maps that are calculated in the routine shown in FIG. 5. Note that the present routine is started during steady operation when the internal combustion engine 10 is in a steady state, and is repeatedly executed for each predetermined control period.

According to the routine illustrated in FIG. 5, first, in step 100, the ECU 50 calculates the current required engine torque based on an accelerator position that is detected by the accelerator position sensor 56. Next, the ECU 50 proceeds to step 102 to calculate the current engine speed using the crank angle sensor 52.

Subsequently, the ECU 50 proceeds to step 104 to calculate a target intake manifold pressure under the current steady operation (corresponds to a target supercharging pressure if the current state is a time of supercharging). A target intake manifold pressure map that is stored in the ECU 50 is a map that defines a target intake manifold pressure based on the relation with the required engine torque and the engine speed. As shown in FIG. 6A, the target intake manifold pressure map is set so that the target intake manifold pressure increases as the required engine torque increases, and so that the target intake manifold pressure increases as the engine speed increases. The ECU 50 refers to this map to acquire a target intake manifold pressure corresponding to the required engine torque and the engine speed acquired in steps 100 and 102.

Next, the ECU 50 proceeds to step 106 to calculate a target throttle opening degree under the current steady operation based on the required engine torque and the engine speed acquired in steps 100 and 102. Specifically, the ECU 50 stores a map (not illustrated in the drawings) in which the relation between the engine speed and the torque boundary value TQ1 is defined (see the curve C1 in FIG. 2), and refers to the map to calculate the torque boundary value TQ1 that corresponds to the current engine speed. When the required engine torque is equal to or greater than the torque boundary value TQ1, the ECU 50 sets the fully open opening degree as the target throttle opening degree. On the other hand, when the required engine torque is less than the torque boundary value TQ1, the ECU 50 calculates the target throttle opening degree as a value that is less than the fully open opening degree in accordance with a map (not illustrated in the drawings) in which the relation between the required engine torque and the engine speed and target throttle opening degree is defined.

Next, the ECU 50 proceeds step 108 to calculate a target WGV opening degree under the current steady operation. A target WGV opening degree map that the ECU 50 stores defines a target WGV opening degree based on the relation with the target intake manifold pressure and the engine speed. In the target WGV opening degree map, the target WGV opening degree is set to a value within a range from a fully open opening degree (maximum opening degree on the opening degree control range) to a fully closed opening degree (minimum opening degree on the opening degree control range) with the relation illustrated in FIG. 6B. The intake manifold pressure and the engine torque are in a proportional relation. Therefore, the setting of the map shown in FIG. 6B has a correlation with the control characteristic of the WGV 46 shown in FIG. 4A that is described above.

More specifically, a range indicated by hatching in FIG. 6B corresponds to the WGV fully open range shown in FIG. 2. A curve C4 indicated by a broken line in the map in FIG. 6B corresponds to the locus of a point of inflection shown in FIG. 4A (that is, an operating point at which the torque boundary value TQ2 is obtained). Among the ranges that are not hatched, a range on a low target intake manifold pressure side relative to the curve C4 corresponds to the single-supercharging range. A range on a high target intake manifold pressure side relative to the curve C4 corresponds to the twin-supercharging range, and in this range the target WGV opening degree is set so as to increase (become a value further on the open side) as the target intake manifold pressure or the engine speed increases. Further, in FIG. 6B, as one example, the relation between the engine torque and the target intake manifold pressure at the engine speed NE1 shown in FIG. 2 is illustrated.

Controlling the WGV opening degree so as to become the target WGV opening degree obtained by referring to the map in FIG. 6B that is described above corresponds to controlling the WGV 46 in accordance with the control characteristic shown in FIG. 4A. The ECU 50 refers to such a map to acquire a target WGV opening degree that corresponds to the target intake manifold pressure and engine speed acquired in steps 104 and 102.

Next, the ECU 50 proceeds to step 110 to calculate a target electric motor output under the current steady operation. A target electric motor output map that the ECU 50 stores is a map which defines the target electric motor output based on the relation with the target intake manifold pressure and the engine speed, and in which the target electric motor output is set based on the relation shown in FIG. 6C in a range corresponding to the twin-supercharging range shown in FIG. 2. A line indicated by "0% output" in the map corresponds to a line at which the external work that the compressor 24a performs changes from zero to a positive amount, and is not a line at which the electric power consumption of the electric motor 24b becomes zero. Further, for the same reasons as described above with respect to the target WGV opening degree map, the target electric motor map has a correlation with the control characteristic of the electric motor output that is shown in FIG. 4B. More specifically, the line indicated by "0% output" in the map passes through operating points at which the torque boundary value TQ2 is obtained. Therefore, controlling the electric motor output so as to become the target electric motor output obtained by referring to this map corresponds to controlling the electric motor output in accordance with the control characteristic shown in FIG. 4B. The ECU 50 refers to such a map to acquire a target electric motor output that corresponds to the target intake manifold pressure and engine speed acquired in steps 104 and 102.

Next, the ECU 50 proceeds to step 112 to control the throttle valve 36, the WGV 46 and the electric motor 24b so as to obtain the target throttle opening degree, the target WGV opening degree and the target electric motor output calculated by the processing in steps 106 to 110. According to the routine shown in FIG. 5 that is described above, the throttle opening degree, the WGV opening degree and the electric motor output can be maintained at values in the vicinity of their respective target values under steady operation.

In the aforementioned first embodiment, TQ2 that is the engine torque that is the limit in the single-supercharging mode is taken as the boundary (torque boundary value) between the single-supercharging range and the twin-supercharging range. However, the engine torque that serves as the above described boundary may be a lower engine torque than TQ2 (for example, TQ4 that is described later).

Note that, in the above described first embodiment, the turbosupercharger 22 corresponds to a "first supercharger" in the present disclosure, the electric supercharger 24 corresponds to a "second supercharger" in the present disclosure, the torque boundary value TQ2 corresponds to "first boundary value" in the present disclosure, the single-supercharging range corresponds to "first torque index value range" in the present disclosure, and the twin-supercharging range corresponds to "second torque index value range" and "increase range" in the present disclosure. Further, the ECU 50 executing the processing in step 112 corresponds to a "controller" in the present disclosure.

Second Embodiment

Next, a second embodiment of the present invention will be described while newly referring to FIG. 7A to FIG. 9. The present embodiment differs from the first embodiment in the respect that control characteristics shown in FIGS. 7A to 7E are used instead of the control characteristics shown in FIGS. 4A to 4C in the aforementioned internal combustion engine 10. Further, in the present embodiment, because of utilizing the setting for the torque boundary value TQ4 that is described with reference to FIGS. 8A and 8B, electric power that is generated at the alternator 28 in the twin-supercharging range is directly supplied to the electric supercharger 24 while performing the electric power generation.

[Technique for Controlling Engine Torque in Second Embodiment]

FIGS. 7A to 7E are views that represent control characteristics with respect to the WGV opening degree and the electric motor output, respectively, that are used in the second embodiment of the present invention. The solid lines in FIGS. 7A to 7E represent cases in which the twin-supercharging mode is available, and the broken lines in FIGS. 7A to 7E represent cases in which the single-supercharging mode is utilized even after exceeding the torque boundary value TQ4. However, in an exceptional case, that is, a case in which a situation (described later) arises in which utilization of electric assist is restricted, the single-supercharging mode may be used in a torque range from the torque boundary value TQ4 to TQ2 that is originally included in the twin-supercharging range. Further, according to the control characteristics shown in FIGS. 7A to 7E, a torque limit in the single-supercharging mode is determined based on a constraint with respect to the exhaust gas temperature, similarly to the first embodiment.

(Characteristic Engine Torque Control Technique in Second Embodiment)

In the vicinity of the engine torque limit in the single-supercharging mode the fuel consumption deteriorates as indicated by the broken line shown in FIG. 7E not only for the reason (increase in the pumping loss) described above with reference to FIGS. 3A to 3C in the first embodiment, but also for the following reason. That is, in the vicinity of the torque limit in the single-supercharging mode, the residual amount of gas inside the cylinders increases because the exhaust gas pressure upstream of the turbine is high, and therefore the temperature in the initial stage of the engine cycle increases. As a result, knocking is liable to occur. Therefore, as shown by the broken line in FIG. 7D, it is necessary to retard the ignition timing by a large amount relative to the optimal ignition timing (MBT) in order to suppress the occurrence of knocking.

Therefore, in the present embodiment, taking into consideration the above described two factors that cause the fuel consumption to deteriorate, the respective control characteristics of the WGV opening degree and the electric motor output are set as follows to further improve the fuel efficiency in the vicinity of the torque limit in the single-supercharging mode. That is, as shown in FIG. 7B, with respect to the control characteristic for the electric motor output, the engine torque TQ4 that is lower than TQ2 that is the limit torque in the single-supercharging mode is taken as the boundary (torque boundary value) between the single-supercharging range and the twin-supercharging range. The electric motor output is controlled so that, at a value that can produce an engine torque that matches the engine torque of the horizontal axis in FIGS. 7A to 7E under the control characteristic for the WGV opening degree shown in FIG. 7A, the electric motor output increases as the engine torque increases.

Further, as shown in FIG. 7A, the control characteristic of the WGV opening degree includes, on a high torque side relative to the torque boundary value TQ4, a "constant range (TQ4 to TQ5)" in which the WGV opening degree is kept constant with respect to a change in the engine torque. As shown in FIG. 7C, an engine torque (torque boundary value) TQ5 that is the upper limit of the "constant range" corresponds to an engine torque value when the exhaust gas temperature reaches the upper limit temperature at a time when the electric motor output is increased while keeping the WGV opening degree constant. Note that, the aforementioned "constant range" is not limited to a range in which the WGV opening degree is kept strictly constant with respect to a change in the engine torque, and may be a range in which the WGV opening degree is kept substantially constant with respect to a change in the engine torque.

As shown in FIG. 7A, a range on a high torque side relative to the torque boundary value TQ5 is set as an "increase range" in which the WGV opening degree increases accompanying an increase in the engine torque. More specifically, the setting of the WGV opening degree in this range is based on the same concept as the setting of the WGV opening degree in the "increase range" on the higher torque side than the torque boundary value TQ2 in the control characteristic shown in FIG. 4A of the first embodiment. That is, a WGV opening degree that is necessary for maintaining the exhaust gas temperature at the upper limit temperature is selected, and an electric motor output that is necessary for generating an engine torque that matches the engine torque of the horizontal axis in FIGS. 7A to 7E under the selected WGV opening degree is selected.

(Ignition Timing Control)

According to the control characteristics shown in FIGS. 7A to 7E, in a torque range from the torque boundary value TQ4 to the torque boundary TQ2 in the twin-supercharging range, electric assist is performed using a larger WGV opening degree than the WGV opening degree corresponding to the torque boundary value TQ4 that is lower than the limit torque in the single-supercharging mode. By this means, in comparison to a time of using the single-supercharging mode, a rise in the exhaust gas pressure upstream of the turbine can be suppressed and pumping loss can be decreased. Since the residual gas amount inside the cylinders is combusted by suppressing an increase in the exhaust gas pressure, the temperature inside the cylinders decreases. As a result, it becomes difficult for knocking to occur. Therefore, according to the twin-supercharging mode accompanied by the control characteristics shown in FIGS. 7A to 7E, the ignition timing can be prevented from being retarded for suppressing the occurrence of knocking or at least the amount of the retard can be reduced. Accordingly, in the torque range (TQ4 to TQ2), as shown in FIG. 7D the ignition timing can be advanced in comparison to that for the single-supercharging mode.

Therefore, in the present embodiment, in a case where electric assist is available in the torque range from the torque boundary value TQ4 to the torque boundary value TQ2, the ignition timing at the respective engine torques in the aforementioned torque range is advanced in comparison to a case where utilization of the electric assist is restricted (that is, a case where it is necessary to utilize the single-supercharging mode).

(Technique for Setting TQ4)

The torque boundary value TQ4 at the boundary between the single-supercharging range and the twin-supercharging range can be set, for example, by a technique that is described hereunder with reference to FIGS. 8A and 8B. The technique for setting the torque boundary value TQ4 is not necessarily limited to the technique described below and, for example, as the control characteristic shown in FIGS. 7A to 7E ultimately becomes, the torque boundary value TQ4 may be an engine torque value in the vicinity of a value at which the fuel consumption amount becomes lowest when using the single-supercharging mode. The setting technique described below is an effective technique for improving fuel efficiency in the case of adopting a configuration that, similarly to the system of the present embodiment, performs electric assist by directly utilizing electric power generated by the alternator 28.

FIGS. 8A and 8B are views that are used for describing a technique for setting the torque boundary value TQ4 from the viewpoint of optimizing fuel efficiency. Each of the relations shown in FIGS. 8A and 8B is one that assumes an engine operation range on a high-rotation and high-load range that requires supercharging at a time of steady operation.

First, FIG. 8A is a view that represents a relation between a fuel consumption amount and the electric power consumption of the electric motor 24b under a condition in which it is assumed that fuel is used to generate engine torque and is not used to generate electric power to be consumed by the electric supercharger 24. Such a condition corresponds to, for example, a time when electric power that is charged in the battery 26 when the engine operating point is in the WGV fully open range is used, or a time when electric power that is supplied to the battery 26 from outside the vehicle is used, in order to perform electric assist.

According to the condition illustrated in FIG. 8A, the fuel consumption amount decreases as the electric power consumption of the electric motor 24b increases. The reason is as follows. Namely, when the turbosupercharger 22 is caused to perform work for supercharging, the exhaust gas pressure increases upstream of the turbine, and this leads to an increase in the pumping loss. In contrast, if work that the turbosupercharger 22 is responsible for is allocated to the electric supercharger 24, a decrease in the pumping loss can be achieved by reducing the work of the turbosupercharger 22. Therefore, the greater the electric power consumption of the electric motor 24b is (that is, the greater the workload that the electric supercharger 24 is responsible for), the less that the fuel consumption amount becomes.

On the other hand, FIG. 8B illustrates a case where electric power generated by the alternator 28 is supplied directly to the electric motor 24b without passing through the battery 26, and electric assist is performed. A solid line in FIG. 8B and a solid line in FIG. 8A represent states under conditions in which the engine torque and the engine speed are the same. In the case of the solid line in FIG. 8B, unlike the case in FIG. 8A, a point exists at which the fuel consumption amount becomes a minimum amount, and the case represented by the solid line in FIG. 8B is not a case in which the fuel consumption amount uniformly decreases as the electric power consumption increases. When electric assist is performed in a range in which the electric power consumption becomes greater than the aforementioned minimum point, the fuel consumption amount increases because an increase in the consumption of fuel that is required to generate electric power necessary for the electric assist acts to negate the effect of suppressing the fuel consumption by performing the electric assist.

A waveform in which the minimum point of the fuel consumption amount exists such as the waveform shown by the solid line in FIG. 8B is a waveform at an operating point at which a waveform that is below a straight line L shown in FIG. 8B is obtained, and is not a waveform obtained at merely any operating point within the supercharging range. More specifically, the waveform indicated by the broken line in FIG. 8B is a waveform at an operating point at which the engine torque is low in comparison to the waveform indicated by solid line in the same figure. At such operating point, an advantage of a reduction in the fuel consumption amount is not obtained even if electric assist is performed, and hence it is preferable not to use electric assist in terms of the fuel consumption amount. In a case where supercharging is required in a high engine speed range, the waveform changes in the direction toward the solid line from the broken line in FIG. 8B as the engine torque increases. A waveform that is below the straight line L is obtained in the course of this change. Accordingly, if the engine torque at which such a waveform is obtained is taken as the torque boundary value TQ4 and a configuration is adopted so that electric assist is performed when the engine torque is equal to or greater than the torque boundary value TQ4, electric assist can be performed in a manner such that the fuel consumption amount decreases even when the electric power consumption of the electric motor 24b is taken into consideration.

Thus, in the case of a configuration in which electric assist is performed by directly utilizing electric power generated by the alternator 28, it is found that adopting an engine torque at which a waveform that is below the straight line L is obtained as the torque boundary value TQ4 is preferable from the viewpoint of reducing the fuel consumption amount. Further, the torque boundary value TQ4 that is determined from this viewpoint changes as the engine speed changes, and, more specifically, becomes lower as the engine speed increases. Therefore, with regard to a tendency of a change with respect to the engine speed, the torque boundary value TQ4 changes in a similar manner to the torque boundary value TQ2 that is used in the first embodiment. By determining the torque boundary value TQ4 having this characteristic in advance and mapping the relation between the torque boundary value TQ4 and the engine speed, the torque boundary value TQ4 that corresponds to the lower limit of the engine torque at which performance of electric assist is preferable from the viewpoint of improving the fuel efficiency can be identified within the engine operation range.

Further, in a case where a minimum point exists with respect to the fuel consumption amount as in the waveform shown by the solid line in FIG. 8B, a value (minimum fuel consumption electric power value) of the electric power consumption at which the minimum point is obtained changes accompanying a change in the engine torque and engine speed. The waveform of the electric motor output (electric power consumption) shown in FIG. 7B corresponds to a waveform that is obtained by connecting minimum fuel consumption electric power values corresponding to respective engine torques under an identical engine speed. That is, the idea described above referring to FIG. 8B is reflected in the control characteristic of the electric motor output shown in FIG. 7B.

(Advantages of Control Technique of Second Embodiment)

As described above, according to the control characteristic illustrated in FIG. 7A, on a higher torque side relative to the torque boundary value TQ4, a "constant range" is provided in which the WGV opening degree is kept constant at a WGV opening degree that corresponds to an engine torque that is lower than a limit torque in the single-supercharging mode (in other words, a WGV opening degree that is greater than the WGV opening degree corresponding to the limit torque). Further, an "increase range" in which the WGV opening degree increases as the engine torque increases is provided as a torque range that continues from the "constant range". Furthermore, electric assist is performed on the higher torque side relative to the torque boundary value TQ4 in the control characteristic shown in FIG. 7B.

According to the control characteristic settings shown in FIGS. 7A to 7E, in comparison to a case of utilizing the single-supercharging mode until reaching the torque limit of the single-supercharging mode, fuel efficiency can be further improved since an increase in the exhaust gas pressure upstream of the turbine can be suppressed and pumping loss can be thereby reduced. More specifically, because pumping loss increases in the vicinity of the torque limit in the single-supercharging mode, the fuel consumption amount increases if the single-supercharging mode is used. On the other hand, on the low torque side relative to the limit torque in the single-supercharging mode, as indicated by the broken line in FIG. 7E, a torque range exists in which the fuel consumption amount decreases. Accordingly, an improvement in the fuel efficiency can be achieved by setting the torque boundary value TQ4 within the low fuel consumption range that exists on the low torque side relative to the limit torque in the single-supercharging mode. Further, the effect of such an improvement in the fuel efficiency can be obtained more effectively by adding the setting of the torque boundary value TQ4 that takes the optimization of fuel efficiency into consideration that is shown in FIG. 8B.

Further, in the control characteristic for the WGV opening degree shown in FIG. 7A, a "constant range" is provided, unlike the control characteristic shown in FIG. 4A. By making the WGV opening degree constant in this manner, it is possible to avoid complicating the control in comparison to a case of controlling both the WGV opening degree and the electric motor output. Further, in the case of the WGV opening degree in a high torque range that is a range such as one in which a constant range is set, setting the WGV opening degree so as to exceed a constant or a substantially constant range and decrease as the engine torque increases even when the rate of decrease is moderate relative to the rate of a change in the WGV opening degree with respect to a change in the engine torque in the single-supercharging range will lead to an increase in the pumping loss. Therefore, from the viewpoint of improving fuel efficiency also, it is favorable to make such a high torque range a "constant range". In addition, since a high torque range in which engine torques are equal to or greater than the torque boundary value TQ5 at which the exhaust gas temperature reaches an upper limit temperature when using the twin-supercharging mode is an "increase range" with regard to setting of the WGV opening degree, it is possible to suppress the occurrence of a situation in which the exhaust gas temperature increases to a temperature that exceeds the upper limit temperature.

Further, according to the present embodiment, in a case where electric assist is available in the torque range from the torque boundary value TQ4 to the torque boundary value TQ2, the ignition timings at the respective engine torques are advanced in the aforementioned torque range in comparison to a case in which utilization of the electric assist is restricted (that is, a case where it is necessary to utilize the single-supercharging mode). The fuel efficiency in the aforementioned torque range is improved more effectively by the action of advancing the ignition timing in this manner. Further, since advancement of the ignition timing makes it possible to increase the generated engine torque in comparison to a case where such advancement is not performed, the electric motor output that is required to realize the same engine torque can be reduced.

Specific Processing in Second Embodiment

Control by the ECU 50 for controlling the engine torque utilizing the control characteristics shown in FIGS. 7A to 7E at a time of steady operation can be realized by causing the ECU 50 to execute the similar processing as in the routine shown in FIG. 5 after replacing the target WGV opening degree map and the target electric motor output map that are shown in FIGS. 6A to 6C with maps in which the steady-state characteristics shown in FIGS. 7A to 7E have been reflected.

FIG. 9 is a flowchart illustrating a routine that the ECU 50 executes to realize the above described ignition timing control in the torque range from TQ4 to TQ2. Note that the present routine is repeatedly executed for each predetermined control period.

According to the routine shown in FIG. 9, first, in step 200, the ECU 50 determines whether or not the current required torque is within the torque range from TQ4 to TQ2. When the result determined in step 200 is affirmative, the ECU 50 proceeds to step 202 to determine whether or not it is possible to use the electric supercharger 24. For example, a case where the necessity has arisen to give priority to a device other than the electric supercharger 24 with respect to the use of electric power generated at the alternator 28 because the amount of power stored in the battery 26 that is detected by the SOC sensor 54 is lower than a predetermined level corresponds to a case where utilization of the electric supercharger 24 is restricted. Further, in some cases utilization of the electric supercharger 24 is restricted due to a constraint from the viewpoint of the temperature of the electric motor 24b. In a case where the utilization of the electric supercharger 24 is restricted and the single-supercharging mode is selected, waveforms indicated by broken lines in FIGS. 7A and 7C to 7E are applied, and the engine torque value TQ2 that is the upper limit value of the engine torque in this case corresponds to "upper limit of a torque index value" in the present disclosure. Further, the WGV opening degree that is used in the constant range when using the twin-supercharging mode becomes larger than the WGV opening degree in a case where the single-supercharging mode is selected in the torque range of torque values equal to and greater than the torque boundary value TQ4.

When it is determined in step 202 that it is not possible to use the electric supercharger 24, that is, in a case where it is necessary to use the single-supercharging mode in exceptional circumstances, the ECU 50 proceeds to step 204. In step 204, a retard map is used for the ignition timing control. In this case, the term "retard map" refers to a map that defines the basic ignition timing based on a relation with the required engine torque and the engine speed while taking into consideration suppressing the occurrence of knocking in the torque range from TQ4 to TQ2 under the single-supercharging mode.

In contrast, when it is determined in step 202 that it is possible to use the electric supercharger 24, that is, in a case where the twin-supercharging mode is used as according to the initial design, the ECU 50 proceeds to step 206. In step 206, an advance map is used for the ignition timing control. In this case, the term "advance map" refers to a map that defines the basic ignition timing based on a relation with the required engine torque and the engine speed while taking into consideration suppressing the occurrence of knocking in the torque range from TQ4 to TQ2 under the twin-supercharging mode. As described above, according to the twin-supercharging mode that is in accordance with the control characteristics shown in FIGS. 7A to 7E, the ignition timing can be prevented from being retarded for suppressing the occurrence of knocking or at least the amount of the retard can be reduced. Therefore, with regard to the same engine operating point in a high-load and high-rotation range in which the occurrence of knocking is a concern, the basic ignition timing defined by the advance map is set to a value that is further on an advance side than the basic ignition timing defined by the retard map.

Note that, the ignition timing control in the present embodiment is control that takes, as a basis, a control based on a basic ignition timing which is in accordance with the retard map or advance map selected depending on whether or not it is possible to use the electric supercharger 24, and that is accompanied by execution of a general optimal ignition timing control. The aforementioned optimal ignition timing control is control that causes the ignition timing to approach as much as possible the optimal ignition timing while correcting the ignition timing so that the occurrence frequency of knocking and the knocking intensity do not exceed the reference values by using a knock sensor (not illustrated in the drawings) for detecting knocking.

In the aforementioned second embodiment, TQ4 that is a lower engine torque than the limit torque that is determined by a constraint of the exhaust gas temperature when using the single-supercharging mode is taken as the boundary (torque boundary value) between the single-supercharging range and the twin-supercharging range. However, the aforementioned boundary that corresponds to a "first boundary value" in the present disclosure may be determined by a constraint of a predetermined parameter other than the exhaust gas temperature. Specifically, for example, the predetermined parameter may be an exhaust gas pressure upstream of the turbine or a pumping loss of the internal combustion engine.

Note that, in the above described second embodiment, the torque boundary value TQ4 corresponds to "first boundary value" in the present disclosure, the torque boundary value TQ5 corresponds to "second boundary value" in the present disclosure, the single-supercharging mode corresponds to "non-motor assisted supercharging mode" in the present disclosure, and the twin-supercharging mode corresponds to "motor assisted supercharging mode" in the present disclosure. Further, the ECU 50 executing the processing in step 206 in a case where the respective results determined in steps 200 and 202 are both affirmative corresponds to the "controller" in the present disclosure.

In the first embodiment the lower limit (also corresponds to the boundary between the single-supercharging range and the twin-supercharging range in the case of the first embodiment) of the "increase range" with regard to the WGV opening degree is set at the torque boundary value TQ2 from the viewpoint of the exhaust gas temperature, while in the second embodiment the lower limit of the "increase range" is set to the torque boundary value TQ5 that is the engine torque at which the exhaust gas temperature reaches the upper limit temperature when using the twin-supercharging mode. Thus, in each of the first and second embodiments, an engine torque that serves as the lower limit of the "increase range" is set based on the exhaust gas temperature. However, a lower limit of the "increase range" in the present disclosure is not limited to a value that is set based on the exhaust gas temperature, and for example the lower limit may be set based on an exhaust gas pressure upstream of the turbine or a pumping loss of the internal combustion engine. More specifically, in the case of the first embodiment, instead of the torque boundary value TQ2, a torque boundary value TQ2' that is determined by taking into consideration a constraint from the viewpoint of the exhaust gas pressure upstream of the turbine or the pumping loss may be set as the lower limit of the "increase range". In the case of the second embodiment, instead of the torque boundary value TQ5, a torque boundary value TQ5' that is determined by taking into consideration a constraint from the viewpoint of the exhaust gas pressure upstream of the turbine or the pumping loss may be set as the lower limit of the "increase range".

In the first and second embodiments, examples have been described in which the "engine torque" itself is used as a "torque index value of the internal combustion engine" in the present disclosure. However, as long as the torque index value has a correlation with the engine torque, the torque index value may be a value other than the engine torque, for example, an intake air pressure, an engine load factor or an intake air amount.

Further, the first and second embodiments have been described by taking as an example the internal combustion engine 10 including the turbosupercharger 22 and the electric supercharger 24 in a configuration in which the compressor 24*a* is provided in series in the intake passage 14 on the upstream side with respect to the compressor 22*a*. However, apart from the above described configuration, an internal combustion engine that is an object of the present disclosure may include a compressor of a turbosupercharger and a compressor of an electric supercharger that are provided in parallel in an intake passage, or may include a compressor of an electric supercharger in an intake passage on a downstream side relative to the compressor of a turbosupercharger. Furthermore, an electric supercharger that is provided separately to a turbosupercharger may be an electric-motor-assisted turbosupercharger.

Figure 10:
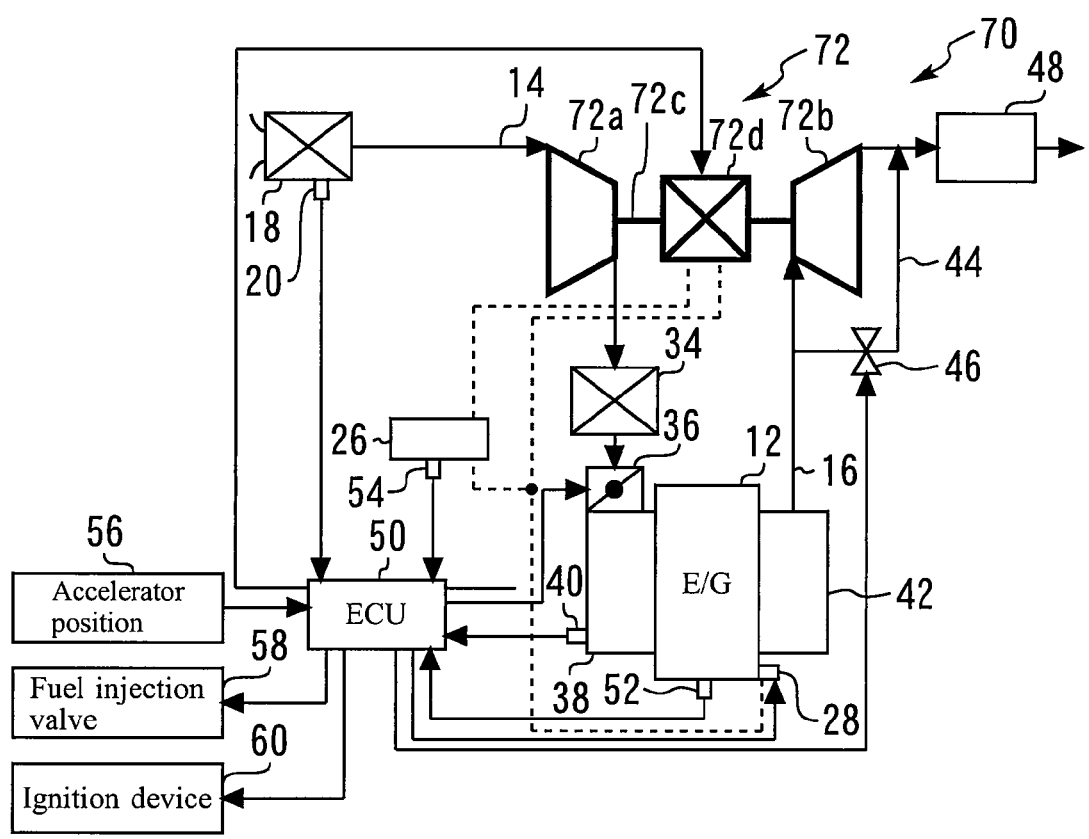
FIG. 10 is a view for schematically describing a system configuration of an internal combustion engine according to another embodiment of the present invention.

Further, the first and second embodiments have been described taking the internal combustion engine 10 including the turbosupercharger 22 and the electric supercharger 24 as an example. On the other hand, FIG. 10 schematically shows a system configuration of an internal combustion engine 70 according to another embodiment of the present invention. The combustion engine 70 shown in FIG. 10 differs from the internal combustion engine 10 according to the first and second embodiments in the respect that an electric-motor-assisted turbosupercharger 72 is included instead of the turbosupercharger 22 and the electric supercharger 24. The electric-motor-assisted turbosupercharger 72 has a configuration which includes a turbine 72*b* arranged in the exhaust passage 16, a compressor 72*a* arranged in the intake passage 14 and an electric motor 72*d* arranged between the turbine 72*b* and the compressor 72*a* (that is, a configuration in which a connecting shaft 72*c* that connects the turbine 72*b* with the compressor 72*a* functions as a rotor of the electric motor 72*d*). According to the electric-motor-assisted turbosupercharger 72 having the configuration described above, supercharging of intake air can be performed by utilizing the electric motor 72*d* as a power source, in addition to supercharging by utilizing exhaust energy that is recovered by the turbine 72*b* as a power source. In the case of an internal combustion engine 70 including only the electric-motor-assisted turbosupercharger 72 as a supercharger, the electric motor 72*d* can be controlled utilizing a control characteristic that is based on the same idea as the control characteristic shown in FIG. 4B or FIG. 7B, and the waste gate valve can be controlled utilizing a control characteristic that is based on the same idea as the control characteristic shown in FIG. 4A or FIG. 7A.

Furthermore, although control that takes a gasoline engine that is a spark-ignition type engine as an object is described in the first and second embodiments, with the exception of the above described ignition timing control, the control of the present disclosure may also be applied to a compression-ignition type engine such as a diesel engine.

The invention claimed is:

1. A control apparatus for an internal combustion engine, the internal combustion engine comprising:
an electric-motor-assisted turbosupercharger configured to supercharge intake air by utilizing exhaust energy that is recovered by a turbine disposed in an exhaust passage of the internal combustion engine and utilizing an electric motor as power sources;
an exhaust bypass passage that bypasses the turbine; and
a waste gate valve configured to open and close the exhaust bypass passage, and
the control apparatus comprising:
a controller, the controller configured to:
control an opening degree of the waste gate valve so that, in a first torque index value range in which a torque index value that has a correlation with an engine torque is less than a first boundary value, the opening degree of the waste gate valve decreases accompanying an increase in the engine torque;
control the opening degree of the waste gate valve so that, in an increase range that is included in a second torque index value range in which the torque index value is equal to or greater than the first boundary value, the opening degree of the waste gate valve increases accompanying another increase in the engine torque; and
actuate the electric motor for supercharging in the second torque index value range.

2. The control apparatus according to claim 1, wherein the controller is configured to take all of the second torque index value range as the increase range and control the opening degree of the waste gate valve so that the opening degree of the waste gate valve increases accompanying the another increase in the engine torque.

3. The control apparatus according to claim 1, wherein the second torque index value range includes a constant range in which the torque index value is equal to or greater than the first boundary value and is less than a second boundary value, and the increase range as a torque index value range in which the torque index value is equal to or greater than the second boundary value, wherein,
in the constant range, the controller is configured to control the opening degree of the waste gate valve so that the opening degree of the waste gate valve is kept constant or substantially constant with respect to a change in the engine torque, wherein
the first boundary value is a torque index value that is lower than an upper limit of a torque index value that is determined by a constraint of a predetermined parameter under a non-motor assisted supercharging mode that is not accompanied by supercharging that adopts the electric motor as a power source, and wherein
the opening degree of the waste gate valve in the constant range is greater than the opening degree of the waste gate valve when the torque index value is the upper limit value in the non-motor assisted supercharging mode.

4. The control apparatus according to claim 3, wherein the controller is configured to advance an ignition timing in a case where a motor assisted supercharging mode that is accompanied by supercharging that adopts the electric motor as a power source is available in a third torque index value range from the first boundary value to the upper limit value, compared to an ignition timing in a case where the non-motor assisted supercharging mode is used in the third torque index value range as a result of utilization of the motor assisted supercharging mode being restricted.

5. The control apparatus according to claim 1, wherein a lower limit of the increase range is set based on an exhaust gas temperature.

6. The control apparatus according to claim 1, wherein a lower limit of the increase range is set based on an exhaust gas pressure upstream of the turbine.

7. The control apparatus according to claim 1, wherein a lower limit of the increase range is set based on a pumping loss of the internal combustion engine.

8. The control apparatus according to claim 1, wherein the first boundary value decreases as an engine speed increases.

* * * * *